March 24, 1953 W. H. PECK 2,632,485
POWER-OPERATED, PREDETERMINED TORQUE RELEASE HAND TOOL
Filed Jan. 13, 1950 2 SHEETS—SHEET 1
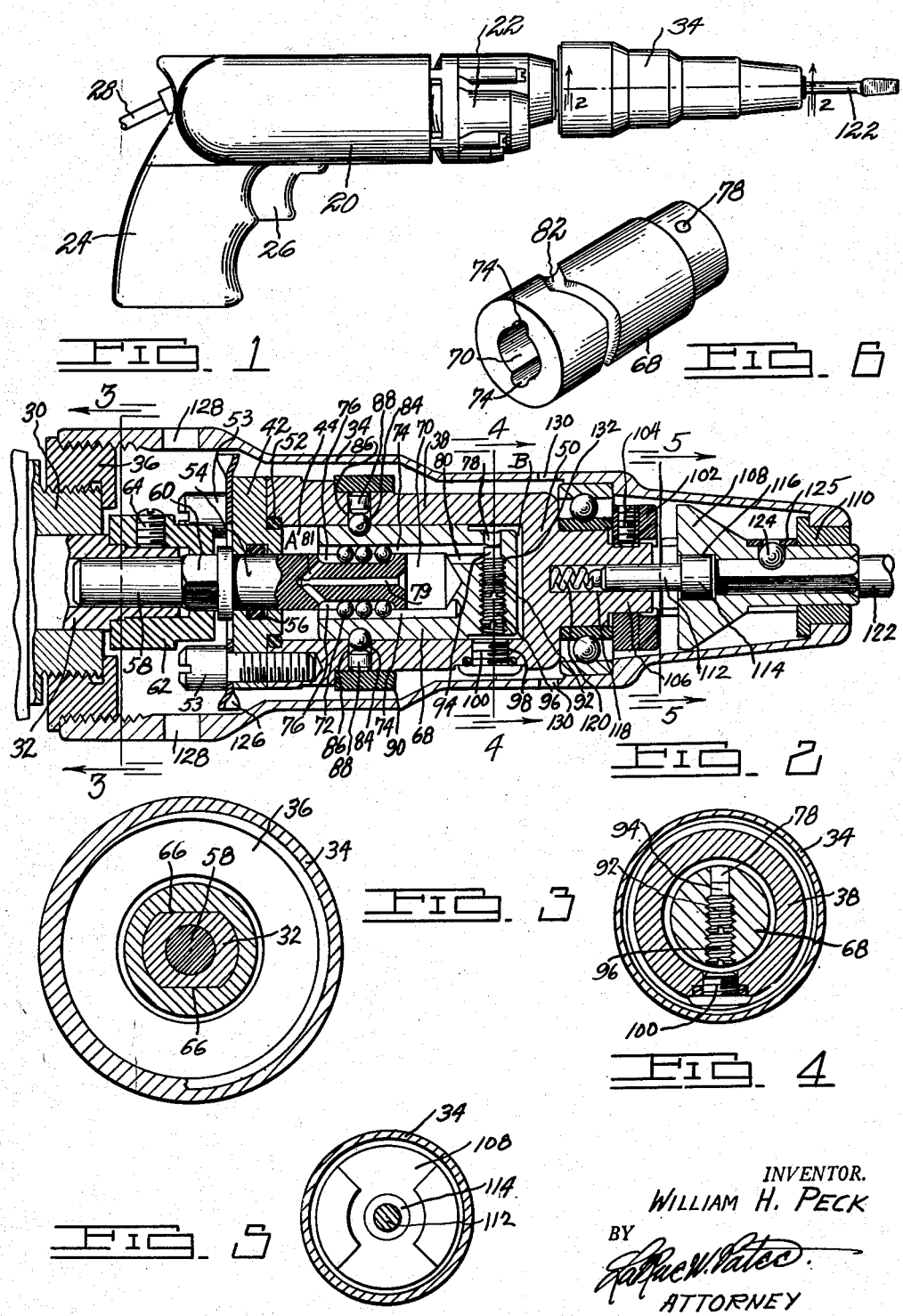
INVENTOR.
WILLIAM H. PECK
BY
ATTORNEY March 24, 1953 W. H. PECK 2,632,485
POWER-OPERATED, PREDETERMINED TORQUE RELEASE HAND TOOL
Filed Jan. 13, 1950 2 SHEETS—SHEET 2
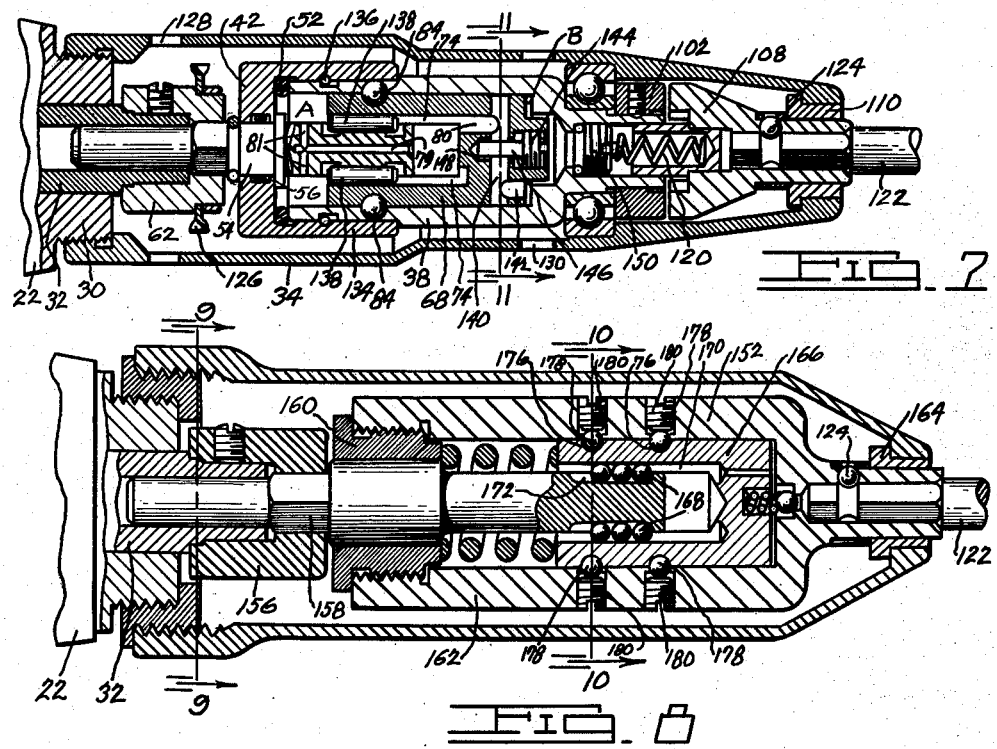
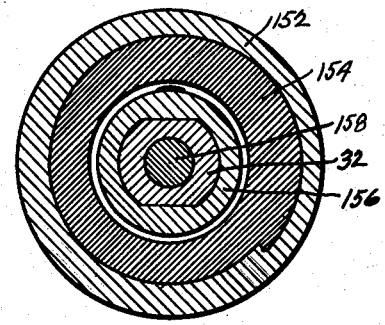
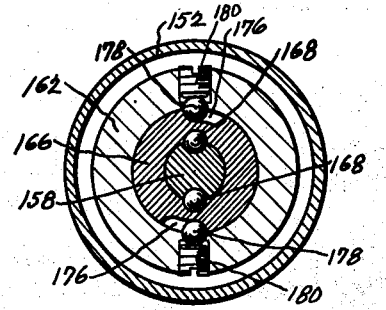
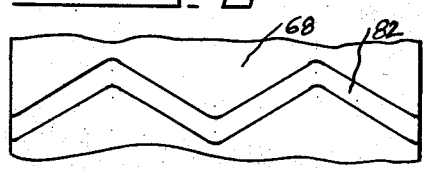
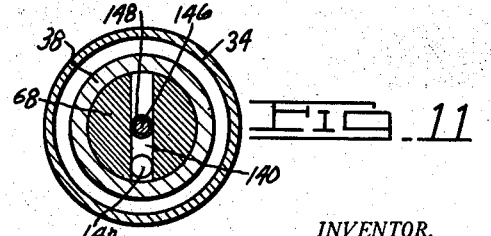
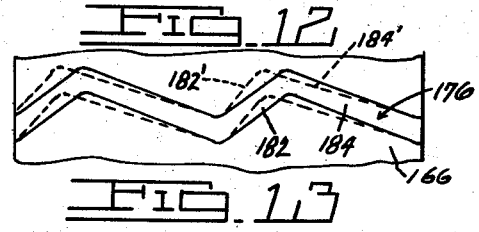
INVENTOR.
WILLIAM H. PECK
BY
ATTORNEY Patented Mar. 24, 1953

2,632,485

UNITED STATES PATENT OFFICE 2,632,485

POWER-OPERATED, PREDETERMINED TORQUE RELEASE HAND TOOL

William H. Peck, Royal Oak, Mich.

Application January 13, 1950, Serial No. 138,348

6 Claims. (Cl. 144—32)

This invention relates to a tool and more particularly to a power driven tool for turning nuts, bolts, screws and the like, commonly referred to as a torque wrench. Heretofore torque wrenches have been made wherein the turning force is indicated to the operator or the tool is permitted to turn relative to the work after a predetermined torque has been applied to the work, such as in the use of slipping clutches and the like.

The present invention, while pertaining generally to such a tool, relates to improved features of operation and construction designed to accomplish new and useful results.

It is an object of the present invention to provide a power driven tool wherein torque power, used in turning the work, is dissipated utilizing it for producing a reciprocating movement, upon reaching a predetermined resistance, so that the turning force is arrested after the predetermined power has been reached.

Another object of the invention is to provide means for varying the torque resistance so that the operator may have a selection of torque power ranges.

A further object of the invention is to provide cooling means for the working parts of the device to remove the heat generated by the conversion of torque motion into reciprocating motion.

A still further object of the invention is to provide a clutch between the work and the torque conversion mechanism which is operable by pressure engagement of the tool with the work.

Other objects and advantages of the invention will more fully appear from the following description taken in connection with the accompanying drawings in which;

Fig. 1 is a side elevational view of a tool showing my improved device applied thereto;

Fig. 2 is an enlarged sectional view taken on line 2—2 of Fig. 1;

Fig. 3 is a sectional view taken on line 3—3 of Fig. 2;

Fig. 4 is a sectional view taken on line 4—4 of Fig. 2;

Fig. 5 is a sectional view taken on line 5—5 of Fig. 2;

Fig. 6 is a perspective view of the reciprocating piston shown in Fig. 2;

Fig. 7 is a view corresponding to Fig. 2 but showing a modified form of the invention;

Fig. 8 is a view corresponding to Fig. 2 but showing a further modification of the invention;

Fig. 9 is a sectional view taken on line 9—9 of Fig. 8;

Fig. 10 is a sectional view taken on line 10—10 of Fig. 8;

Fig. 11 is a sectional view taken on line 11—11 of Fig. 7;

Fig. 12 is a developed view showing the groove in the peripherial surface of the reciprocating piston shown in Figs. 2 and 6; and Fig. 13 is a developed view showing one of the grooves in the peripherial surface of the reciprocating piston shown in Fig. 8.

Referring to the drawings, I have shown the tool having a body portion 20 in which an electric motor is mounted for power driving means to a transmission housing 22. The body portion 20 is provided with a handle 24, a finger control switch 26, and an electrical lead 28. The transmission housing 22 is provided with a threaded end portion 30 and a driving shaft 32 which is rotated through the transmission by the motor in the body 20.

My improved mechanism is adapted to be received on the threaded end portion 30 and the operating mechanism has a driving connection with the shaft 32. The driven torque conversion mechanism comprises a tubular casing 34 adapted to be screw threaded on an adapter 36 which fits the threaded end portion 30.

A sleeve 38 is rotatably supported in the casing 34 and is journaled in a bearing 40. The sleeve 38 has a removable head 42 which forms therewith a piston chamber 44, one end being closed as at 50 and the opposite end sealed with the head 42 by a packing 52. Screws 53 retain the head 42 on the sleeve 38. An axially extending shaft 54 is rotatably supported in the head 42. A packing member 56 forms a seal between the shaft 54 and the head 42 with one end of the shaft 54 projecting into the piston chamber 44. The opposite end of the shaft 54 is piloted, as at 58, into the driving shaft 32. Externally of the head 42 and adjacent the pilot 58, the shaft 54 has a rectangular portion 60 which receives a sleeve 62. One end of the sleeve 62 fits the rectangular portion 60 and a set screw 64 secures the sleeve 62 to the shaft 32. In addition to the screw 64, the outer face of the shaft 32 is flattened as at 66 to form a driving connection from the shaft 32 through the sleeve 62 to the shaft 54.

A piston 68 having an axially extending bore 70, adapted to slidingly receive the outer end of the shaft 54, is slidably mounted in the piston chamber 44 relative to the sleeve 38 and the shaft 54. To prevent relative rotation of the piston 68 and the shaft 54 and yet permit relative axial movement, a plurality of balls 72 are arranged in oppositely disposed grooves 74 and 76 in the adjacent faces of the piston 68 and shaft 54 respectively.

The piston chamber 44 is divided into two pressure chambers A and B by the piston 68. A transverse passage 78 in the piston head and an axially extending passage 80, connecting the passage 78, the bore 70 and grooves 74 and 76, from an intercommunication between the two chambers A and B, so that as the piston is moved axially in the chamber 44 the fluid is conducted from one of the chambers A and B to the other through the passages 74, 80 and 78. In addition to these passages, there are provided passages 79 and 81 in the shaft 54 to permit a flow of fluid from one chamber to the other.

A cam track in the form of a zig zag groove 82, more clearly shown in Figs. 6 and 12, is formed in the outer periphery of the piston 68. A ball 84 or, as shown, radially disposed balls are received in radial apertures 86 in the wall of the sleeve 38. These balls are positioned in the groove 82 and form a driving connection between the piston 68 and the sleeve 38. The balls 84 are held radially inwardly by plugs 88 which in turn are held in position by a press fit ring 90 on the outer periphery of the sleeve 38. By relative rotation of the piston 68 and the sleeve 38 the balls 84, in the cam track 82, cause the piston 68 to reciprocate axially relative to the sleeve 38, thus alternating the pressures in the chambers A and B with the fluid flowing from one to the other through the passages 81, 79, 74, 70, 80 and 78.

An inter-changeable restriction comprising a threaded plug 92, having a projection 94 substantially the diameter of the passage 78 and in axial alignment therewith, is threaded in the head of the piston 68. The projection 94, depending upon its axial position with respect to the opening of the passage 78, restricts the flow of fluid from one of the chambers A and B to the other. A locking screw 96 holds the plug 92 in adjusted position. An opening 98, in axial alignment with the plug 92 and screw 96, is provided to permit access to the screw and plug. A closure 100 is provided for the opening 98.

At the outer end of the sleeve 38 one member 102 of a jaw clutch is secured by screw 104 to an extension 106 of the sleeve 38. The other member 108 of the jaw clutch is journaled in a bushing 110 mounted in the outer end of the casing 34. A pin 112 having a head 114, the latter fitting a counterbore 116 in the jaw clutch member 108, is piloted into a bore 118 in the sleeve 38. A coil spring 120 urges the pin 112 and jaw clutch member outwardly for normal dis-engagement of the jaw clutch members. The tool, herein shown as a screw driver 122, has a square shank and fits a square opening in the clutch member 108 for turning engagement therewith. The tool is retained in position by a spring pressed ball 124 fitting a notch in the shank of the tool. A spring C ring 125 resiliently holds the ball in retaining position so that the tool can be spring pressed into or out of position.

A fan 126, mounted for rotation with the sleeve 38 and when rotating with the sleeve, causes a circulation of air through openings 128 and 130 for cooling the rotating parts within the casing 34.

When the switch 26 is turned on the motor in the body portion 20 rotates the shaft 32 causing rotation of the shaft 54 and piston 68. With the restriction in the flow of fluid from one chamber to the other, A or B, the resistance to axial movement of the piston 68 is great enough to cause the cam track, acting through the balls 84, to rotate the sleeve 38. This rotation causes rotation of the one clutch member 102 but does not cause rotation of the screw driver 122 because the clutches are normally disengaged. When the operator applies the tool to a work piece an axial pressure causes the tool 122, clutch member 108 and the pin 112 to move axially inwardly against the pressure of the spring 120. This causes engagement of the clutch members 102 and 108 establishing a driving connection from the rotating sleeve 38 to the tool 122. As soon as the torque force has reached a predetermined load, as by the turning resistance of the work, the torque load is increased on the piston 68 which, due to the cam track 82, produces an axial pressure on the piston. This pressure is resisted by the flow of fluid from one chamber to the other, the resistance of which is dependent upon the restriction from the passage 78 to the passage 80. After the resistance of the axial movement of the piston is overcome by the torque force on the tool 122 and sleeve 38, the additional forces are applied to produce a reciprocating motion of the piston 68, thereby discontinuing rotary motion to the sleeve 38 and the torque forces are not increased beyond the predetermined amount. When the operator releases the axial pressure on the work, as in removing the tool from the work, the spring 120 forces the clutch member 108 outwardly, disengaging the clutch members 102 and 108 so that there is no torque resistance to the sleeve 38 whereupon it starts turning with the turning of the shaft 32, shaft 54 and piston 68. Due to the restricted flow of fluid through the passage 78, the piston 68 discontinues its reciprocating motion. By the disengagement of the clutch members 102 and 108, the tool 122 is no longer rotated and the operator can easily insert the stationary tool in another work piece for repeated operation.

The restriction to fluid flow is determined by the size or location of the projection 94, on the plug 92, relative to the passage 78. Preferably the plug 92 is designed to seat on a shoulder 132 so that the end of the projection 94 is spaced from the open end of the passage 78 a predetermined distance therefrom, depending upon the variable length of the projection 94. However, the projection may be made having a variable diameter to be received in the passage 78 for varying the flow therethrough. A series of plugs having variable size projections are maintained so that the operator may select the proper plug to give the desired restriction depending upon the torque required to be applied to the work.

The form of the invention illustrated in Fig. 7 is substantially the same as the form shown in Figs. 2 to 6 inclusive, except for modifications hereinafter set forth. The same numerals designate corresponding parts, even though there is a slight variation in size and shape. The parts have been reduced in size so that the casing 34 is threaded directly to the end portion 30 of the transmission housing 22, thus eliminating the adapter 36, shown in Fig. 2. The fan 126 has been mounted on the sleeve 62 which rotates at all times during motor drive. By this arrangement there is a circulation of air through the casing during rotation or idle conditions of the sleeve 38. Since there is more heat generated in the working parts during the time that there is relative rotation of the sleeve 38 and shaft 54, this arrangement of the fan is preferred to the form shown in Fig. 2 wherein the fan is located on the sleeve 38.

The balls 84, forming a driving connection between the piston 68 and the sleeve 38, are retained in operative position by a sleeve 134 integral with the head 42 and an additional sealing ring 136 is provided.

Rollers 138 form the driving connection between the shaft 54 and the piston 68 and permit relative axial movement of the parts through the grooves 74. One of the grooves 74 is extended outwardly into the head of the piston forming a passage 80.

A transverse passage 140 is formed in the piston head and intersects the passage 80. A passage 142 intersects the passage 140 and extends through the end face of the piston head to the chamber B. The shaft 54 is provided with passages 79 and 81 for conducting a fluid from the chamber A to the chamber B through the passages 81, 79, 80, 140 and 142.

In this form of the invention the restriction for the flow of fluid through the passages comprises a screw 144 having a projection 146, extending axially of the piston, and the screw 144 is threaded into the outer end of the piston head with the end of the projection entering an aperture 148 with the end thereof in contact with the closed end of the aperture 148. The projection extends across the passage 140 and the diameter of the projection relative to the diameter of the passage 140 determines the amount of fluid leak through the passage 140. If it is desired to increase the restriction to flow a screw having a larger diameter projection is used. A closure screw 150 is provided in the end of the sleeve 38 to close the chamber B and permit the operator to have access to the screw 144 for replacement purposes.

The sleeve 38 is journaled in the bearing 40 and the jaw clutch members 102 and 108 are provided as in the form shown in Fig. 2. The tool 122 is urged outwardly by the spring 120. The operation of the clutches 102 and 108 is the same as described in connection with construction shown in Fig. 2.

In the form of the invention shown in Figs. 8, 9, 10 and 13, a spring resistance mechanism has been substituted for the fluid pressure resistance, the means for varying the torque pressure has been modified, and the jaw clutch members have been omitted.

A casing 152 is screw threaded to an adapter 154 which is threaded to the transmission housing 22. The driving shaft 32, through connector 156, drives an axially extending shaft 158. Rotatably mounted on the shaft 158 is a bearing 160. Threaded on the bearing 160 is a sleeve 162 having its outer end journaled in a bearing 164 supported by the casing 152. The tool 122 is held in the end of the sleeve 162 by means similar to that shown in Figs. 2 and 7.

A piston 166 is mounted in the sleeve 162 for reciprocation and is rotatably driven by the shaft 158 through balls 168 in oppositely disposed grooves 170 and 172 in the piston 166 and shaft 158 respectively. A coil spring 174, surrounding the shaft 158, is under compression between the inner end of the piston 166 and the outer end of the bearing 160. This spring urges the piston 166 axially toward the closed end of sleeve 162.

A pair of cam tracks 176, one shown in developed form in Fig. 13, are provided in the peripherial surface of the piston 166. Balls 178, held in a position to form a driving connection between the piston 166 and the sleeve 162, are held in place by screws 180. It is to be understood that while these balls 178 form a driving connection between the piston 166 and sleeve 162 they are rotatable in the path of the grooves 176 during relative rotation of the piston 166 and sleeve 162.

Referring now specifically to one of the tracks, shown in Fig. 13, the track is formed in two parts, an ascending portion 182 and a descending portion 184. These tracks are arranged on the peripherial surface of the piston so that the ascending portion 182 produces a force causing the piston 166 to move in a direction to compress the spring 174 and the descending portion 184 permits the force of the spring 174 to move the piston in the opposite direction. When the torque load on the work is less than the force required to overcome the compression of the spring 174, the balls 178 do not rotate in the groove but form a driving connection between the piston 166 and the sleeve 162. This is dependent upon the angular relation of the ascending portion 182 to the axis of the piston 166. If it is desired to increase the torque applied to the work the angle is increased, as designated by the dotted lines 182' in Fig. 13; that is, the angle more closely approaches a line parallel to the axis of the piston.

The tool 122 is held in the outer end of the rotating sleeve 162 by the spring pressed ball 124 in the same manner as defined in the construction shown in Fig. 2.

From the above it will be apparent that the structure provides a tool wherein predetermined torque power may be applied to the work and when that power has been reached greater torque power is dissipated so that an overload is not applied to the work. The device permits a variation in the torque power applied, thereby making it applicable to various types of work.

While I have illustrated and described preferred and modified forms of the device, it will be understood that various changes including the size, shape and arrangement of parts may be made without departing from the spirit of my invention and it is not my intention to limit its scope other than by the terms of the appended claims.

I claim:

1. A tool for rotating a work piece comprising, a rotatable shaft, a piston rotatable with said shaft and axially movable relative to said shaft, a sleeve forming a chamber for said piston, said piston dividing the chamber into pressure chambers, one at each end of said piston, a fluid passage through said piston forming a communication between the two end chambers, a restrictive means in said passage, means including a cam and cam follower for providing a slip drive connection between said sleeve and said piston whereby relative rotation between said sleeve and said piston produces relative axial movement there between, and a work piece engaging member driven by said sleeve.

2. A tool for rotating a work piece comprising, a rotatable shaft, a piston rotatable with said shaft and axially movable relative to said shaft, a sleeve forming a chamber for said piston, said piston dividing the chamber into pressure chambers, one at each end of said piston, a fluid passage through said piston forming a communication between the two end chambers, a replaceable restrictive means in said passage, means including a cam and cam follower for providing a slip drive connection between said sleeve and said piston whereby relative rotation between said sleeve and said piston produces relative axial movement there between, and a work piece engaging member driven by said sleeve.

3. A tool for rotating a work piece comprising, a rotatable shaft, a piston rotatable with said shaft and axially movable relative to said shaft, a sleeve forming a chamber for said piston, said piston dividing the chamber into pressure chambers, one at each end of said piston, a fluid passage through said piston forming a communication between the two end chambers, a replaceable restrictive means in said passage, means including a cam and cam follower for providing a slip drive connection between said sleeve and said piston whereby relative rotation between said sleeve and said piston produces relative axial movement there between, a work piece engaging member driven by said sleeve, and a jaw clutch element between said sleeve and said work piece engaging member.

4. A tool for rotating a work piece comprising, a rotatable driving member, a rotatable driven member, means including a cam and cam follower forming a driving connection between said members up to a predetermined torque resistance, and producing relative reciprocation and relative rotation of said members beyond the predetermined torque resistance, and a fluid resistance pressure means for preventing relative reciprocation of said members.

5. A tool for rotating a work piece comprising, a rotatable driving member, a rotatable sleeve forming a chamber around said rotatable driving member, a reciprocatory member dividing the chamber into pressure chambers, one at the opposite ends of said reciprocatory member, a driving connection between said driving member and said reciprocatory member, means for producing a fluid pressure resistance to the movement of said reciprocatory member, and a slip drive connection between said sleeve and said reciprocatory member whereby resistance to said reciprocatory member causes driving engagement between said sleeve and said piston and when the resistance to rotation of said sleeve overcomes the resistance to the reciprocatory member there is relative rotation between said sleeve and said reciprocatory member.

6. A tool for rotating a work piece comprising, an outer rotatable member, an inner rotatable member, an intermediate rotatable member, said intermediate member being axially movable relative to said inner and outer members, a positive driving connection between said inner member and said intermediate member, a slip drive connection between said outer member and said intermediate member, and fluid pressure resistance means between said intermediate member and said outer member, said intermediate member and said outer member being rotatable in unison under a predetermined fluid pressure resistance and being relatively rotatable above the predetermined pressure resistance.

WILLIAM H. PECK.

REFERENCES CITED

The following references are of record in the file of this patent:

UNITED STATES PATENTS

| Number | Name | Date |
|---|---|---|
| 1,082,771 | Russell | Dec. 30, 1913 |
| 1,525,545 | James | Feb. 10, 1925 |
| 1,855,456 | Miller | Apr. 26, 1932 |
| 1,954,620 | Connell | Apr. 10, 1934 |
| 2,127,855 | Baumgratz et al. | Aug. 23, 1938 |
| 2,415,552 | Broecker | Feb. 11, 1947 |
| 2,482,995 | Willis | Sept. 27, 1949 |